US006758031B2

(12) United States Patent
Franet et al.

(10) Patent No.: US 6,758,031 B2
(45) Date of Patent: Jul. 6, 2004

(54) CUTTING ANGLE ADJUSTMENT FOR MOWING HEADS

(75) Inventors: Roger Franet, Sarraguemines (FR); Lionel Guiet, Gray (FR); Hubert Defrancq, Guignicourt (FR); Daniel Kem, Moulins (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/134,286

(22) Filed: Apr. 29, 2002

(65) Prior Publication Data

US 2002/0174634 A1 Nov. 28, 2002

(30) Foreign Application Priority Data

Apr. 28, 2001 (DE) .......................................... 101 21 014

(51) Int. Cl.[7] .............................................. A01D 34/64
(52) U.S. Cl. ..................... 56/14.9; 56/15.2; 56/DIG. 10
(58) Field of Search ........................... 56/6, 14.7, 14.9, 56/15.1, 15.2, DIG. 10, 15.5, 15.9, 7, 13.6

(56) References Cited

U.S. PATENT DOCUMENTS

| | | | | |
|---|---|---|---|---|
| 3,113,411 A | * | 12/1963 | Hall ............................ | 56/15.7 |
| 3,483,683 A | * | 12/1969 | McCanse ..................... | 56/10.7 |
| 3,824,772 A | * | 7/1974 | Sorenson et al. ................ | 56/7 |
| 4,021,996 A | * | 5/1977 | Bartlett et al. .................... | 56/7 |
| 4,177,625 A | * | 12/1979 | Knight et al. ................ | 56/13.6 |
| 4,178,746 A | | 12/1979 | Allely ........................... | 56/53 |
| 4,183,195 A | * | 1/1980 | James ......................... | 56/11.9 |
| 4,370,846 A | * | 2/1983 | Arnold ............................ | 56/6 |
| 4,912,916 A | * | 4/1990 | Parsons, Jr. .................. | 56/15.2 |
| 4,972,664 A | * | 11/1990 | Frey ............................ | 56/13.6 |
| 5,069,022 A | | 12/1991 | Vandermark ..................... | 56/6 |
| 5,133,174 A | * | 7/1992 | Parsons, Jr. ....................... | 56/6 |
| 5,210,997 A | * | 5/1993 | Mountcastle, Jr. ............ | 56/15.2 |
| 5,280,695 A | * | 1/1994 | Nunes et al. ..................... | 56/6 |
| 5,297,378 A | | 3/1994 | Smith .............................. | 56/7 |
| 5,341,629 A | * | 8/1994 | Penner ........................ | 56/15.2 |
| 5,375,398 A | * | 12/1994 | McClymonds .............. | 56/15.2 |
| 5,430,999 A | * | 7/1995 | Grant .......................... | 56/11.9 |
| 5,706,638 A | * | 1/1998 | Kinder et al. ............ | 56/10.2 E |
| 5,901,538 A | * | 5/1999 | Vohl ........................... | 56/15.2 |
| 6,125,619 A | * | 10/2000 | Wolff .......................... | 56/14.9 |

FOREIGN PATENT DOCUMENTS

| | | |
|---|---|---|
| DE | 196 20 071 | 10/1997 |
| EP | 0 642 731 | 3/1995 |
| EP | 0 740 898 | 11/1996 |
| EP | 0 801 888 | 10/1997 |
| EP | 0 804 870 | 11/1997 |
| FR | 2747879 | * 4/1996 |
| FR | 2 747 879 | 10/1997 |

\* cited by examiner

*Primary Examiner*—Thomas B. Will
*Assistant Examiner*—Alicia Torres

(57) ABSTRACT

A mowing arrangement includes a main, mobile frame to which a base or first carrier part or frame is mounted for being pivoted vertically by a remotely operable hydraulic motor. Mounted to the base carrier frame is a second carrier part to which arms supporting opposite side and front mowing units are attached. The front-mounted mowing unit is mounted to the second carrier part through the agency of a fourth carrier part, in the form of a parallelogram linkage that includes the support arm for the front-mounted mowing unit. The second carrier part is mounted for pivoting about a transverse, horizontal axis so that the cutting angles of each of the mowing heads can be remotely adjusted by pivoting the second carrier part. A third carrier part is fixed for movement with the second carrier part and supports a drive transmission having output shafts respectively coupled for supplying power to the three mowing heads.

12 Claims, 3 Drawing Sheets

CUTTING ANGLE ADJUSTMENT FOR MOWING HEADS

FIELD OF THE INVENTION

The invention concerns a mowing arrangement with a carrier that can be moved in the upward direction with at least one carrier part for the support of one or more mowing units.

BACKGROUND OF THE INVENTION

Mowing arrangements, in particular for grass, are provided with a mowing head whose inclination to the ground can be adjusted, in order to avoid the entry of stones or other foreign objects, in order to attain a particular height of the stubble and in order to create an equalization when the wheels of the carrier vehicle sink into the ground.

The adjustment of this so-called cutting angle is performed by a change in the length of the upper suspension arm in mowing arrangements that are connected to a front or rear three-point implement hitch. In towed mowing arrangements, for example, according to U.S. Pat. No. 4,177,625, a mowing head engages lower suspension arms so as to pivot vertically from a frame. Between the upper side of the mowing head and the frame, an upper suspension arm extends that can be varied in length in order to adjust the cutting angle of the mowing head relative to the ground.

The problem underlying the invention is seen in the fact that adjustment of the cutting angle is awkward and hence is performed only in special circumstances.

SUMMARY OF THE INVENTION

According to the present invention, there is provided an improved arrangement for adjusting the cutting angle of mowing heads.

An object of the invention is to provide a mower unit suspension that allows the cutting angle to be easily adjusted from an operator's platform, so that this is utilized optimally and the correct cutting angle is selected each time. For example, at the edge of a field a flat cutting angle of 0 degrees can be selected so that no stones or the like are picked up which could damage the mowing head or heads or contaminate the forage, while after the first pass of the mower the cutting angle is repositioned to approximately 4 to 6 degrees, so that the remaining stubble is not too high. Such a repositioning arrangement that can be controlled remotely may be a mechanical linkage as well as a push-pull cable control, a hydraulic motor or an electric motor which, in particular, can be controlled electrically.

A more specific object of the invention is to provide a mower unit mounting including a first or base carrier part attached to the carrier vehicle so as to pivot vertically and so as to be loaded by a lifting arrangement, the lifting range being increased beyond the adjustment range of the cutting angle by a simple pivoting movement. In the case where the carrier vehicle is designed as that of a self-propelled forage harvester, the bearings of, for example, a chopper drum attached to the carrier vehicle, can be used simultaneously as bearings for the first carrier part.

Yet a more specific object is to provide a second carrier part pivotally mounted to the base carrier part for vertical pivoting movement about a horizontal transverse pivot bearing axis arranged above a remotely operable adjusting device such that a repositioning is also possible in cases in which the mowing arrangements, for example, with self-propelled mowing vehicles is modified, and is either not retained by an upper steering arm or no space is available above for an adjusting arrangement.

Still, another object of the invention is to provide an adjusting arrangement for achieving a uniform repositioning of the cutting angle of several mowing units, this being possible if several mowing units are attached to the second carrier part, for example, two mowing units in a mirror-image arrangement. This characteristic reduces the manufacturing cost and the operator effort. The mirror-image arrangement and thereby the arrangement at an equal spacing from the carrier vehicle has the effect that a repositioning of the second carrier part leads to the same changes in the cutting angle.

A further object of the invention is to provide a mowing arrangement for high performance in a self-propelled configuration equipped with several mowing units that are arranged offset to each other in the direction of mowing, and including a cutting angle adjusting or positioning arrangement designed to avoid developing differing cutting angles due to lever arms of differing lengths by making provision for a further mowing unit attached, in particular by an arm so as to pivot vertically on the second carrier part or a fourth carrier part connected to it, and that a positioning arrangement is located between the first carrier part and the front-mounted mowing unit, so that a form of parallelogram linkage results which guarantees a parallel guidance and thereby to equal cutting angles on all mowing units. In its simplest form the adjusting or positioning arrangement may be of invariable length, for example, a chain, a rope, a strut or the like. The fourth carrier part, that is connected with the second carrier part carrying the side mowing units, makes it possible to apply a standard mowing unit or a mowing unit as is otherwise applied in the mowing arrangement, and to attach it offset to the remaining mowing units. The uniform movement relative to the ground is assured by the rigid connection with the second, movable carrier part.

Yet another specific object of the invention is to provide an adjusting or positioning arrangement as set forth in one or more of the previous objects and to further provide an arrangement of the transmission to the side of the adjusting or positioning arrangement which prevents it from touching or even damaging the third or the first carrier during a vertical movement of the fourth carrier part. Furthermore an unimpeded routing of drive shafts or the like is possible.

Still another object of the invention is to provide a mowing arrangement as defined in any of the previous objects wherein the use of a positioning arrangement between the second and the fourth carrier parts makes it possible to raise and remove the mowing unit attached to the fourth carrier part independent of one or more other mowing units and thereby to bring it into a non-operating position, or to overrun an obstacle without any other trouble.

Another object of the invention is to provide a mowing arrangement having, in addition to a cutting angle adjusting arrangement, as defined in one or more of the foregoing objects, a mowing unit mounted to a horizontally pivoted arm for making it possible, on the one hand, to increase the mowing width and, on the other hand, to reduce the width of the mowing arrangement for transport operation.

Although it would fundamentally be possible to reposition the carrier and with it all participating mowing units in the height by means of a parallelogram or the like then the repositioning in height resulting from a pivoting process does offer advantages due to the simple movements and parts in the manufacture and reliability. In view of the fact that the first carrier part is in contact with the lifting arrangement only in one direction, but is free in the other direction, unnecessary loading of the lifting arrangement is avoided, when the carrier vehicle operates through a depression and the carrier with the mowing units cannot follow the lifting arrangement that is moving downward by reason of the inertia.

The use of a connecting console, that is, an adapter, a coupling or the like for the connection of the mowing unit with the particular arm, has the advantage that mowing units are easily dismounted and mounted and thereby can be replaced. The connection in joints makes it possible that the mowing unit can conform to irregularities in the ground.

Rapid interchangeability of individual mowing heads for maintenance purposes can be easily accomplished if the take-ups on all mowing heads are provided with interchangeable connecting flanges and a pivot bearing with a horizontal pivot axis extending in the direction of mowing. In this way either identical flanges or hole patterns or flanges with hole patterns can be applied, that fit each mowing head. Couplings with pins, hook couplings and the like are conceivable for the connection.

The drawing shows an embodiment of the invention that shall be described in greater detail in the following.

DESCRIPTION OF THE PREFERRED EMBODIMENT

Figure 1:
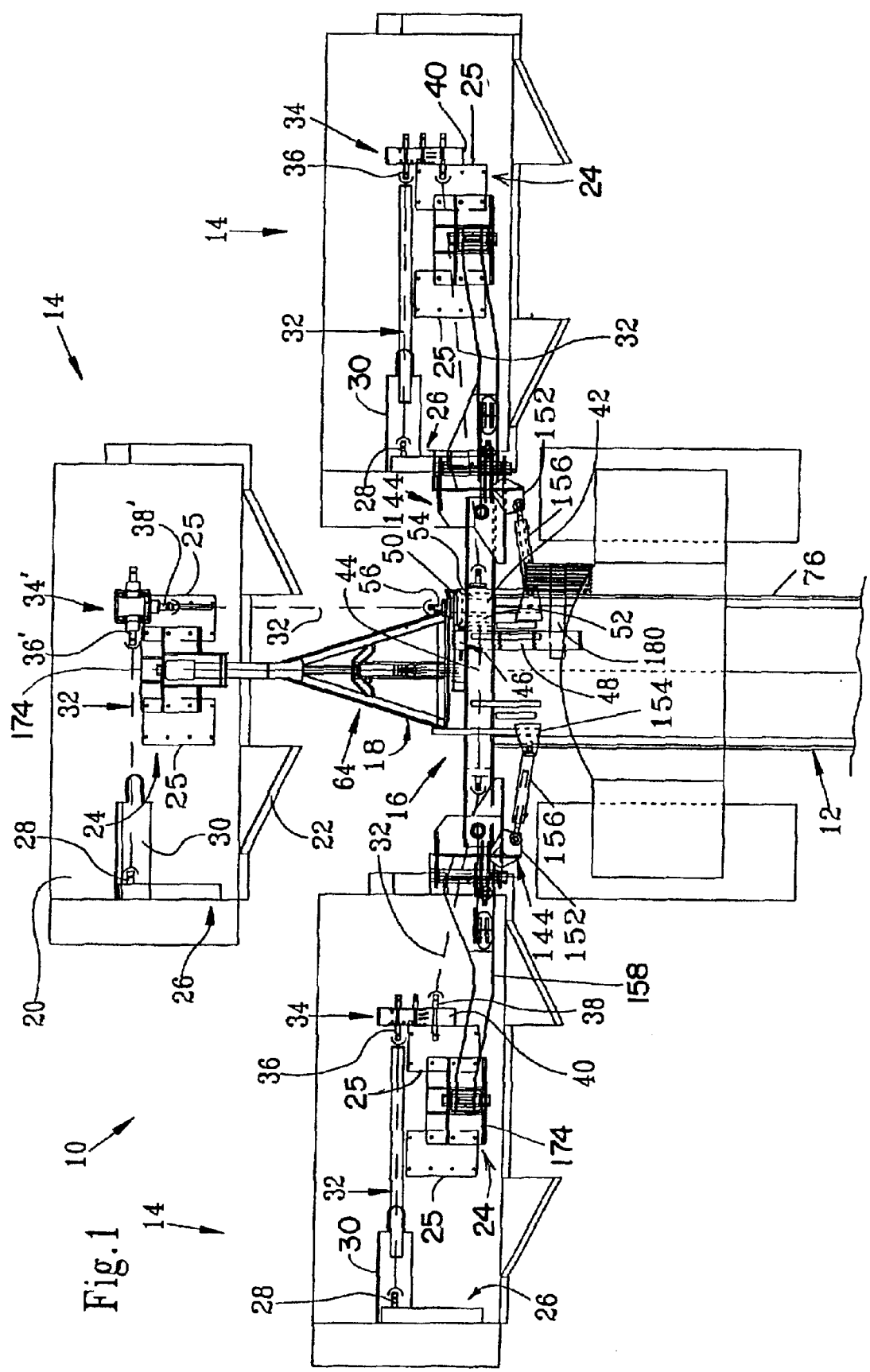
FIG. 1 is a plan view of a mowing arrangement mounted to a front end of a traction unit.

Referring now to FIG. 1, there is shown a mowing arrangement 10 constructed according to the invention and including a carrier vehicle or traction unit 12 having a main frame 76 to the front end of which several mowing units 14 are mounted through the agency of a common carrier frame 16.

The mowing arrangement 10 is used for the mowing of grass or other crops and having a width of cut during operation of, for example, 9 meters, which lies considerably above the width allowed for the transport on public roads. For transport on public roads the mowing arrangement 10 is brought to a width of 3 meters maximum, as is described below.

The carrier vehicle 12 can be configured as an agricultural tractor with a front power lift or with a transmission and seat designed for reverse operating arrangement. But, the carrier vehicle 12 can also be a forage harvester, a combine or a self-propelled vehicle configured especially for mowing or others. In the embodiment illustrated, the carrier vehicle 12 is a self-propelled forage harvester with a front lifting arrangement 18 (FIGS. 2 and 3) and a configuration that is known from forage harvesters of the John Deere Company.

The mowing units 14 are configured nearly identically and kept in the form of a known front mowing head. In a manner not shown each mowing unit is equipped with a mowing head that may be configured, for example, as a disk mowing head, drum mowing head or as a cutter bar. If desired, the mowing head can be followed downstream by a processing arrangement, for example, a stalk crimping or conditioning arrangement or the like. In any case, each mowing unit 14 includes a housing 20, a rear swath-forming arrangement 22, a flange region 24 and a power-distributing transmission or gearbox 26.

The housing 20 is generally configured in known manner and consists of a bolted or welded assembly of sheet metal plates and tubes, that is surrounded at its sides by plastic skirts and forms a rigid top cover.

The swath-forming arrangement 22 delivers the mowed and, if necessary, processed crop on the ground at the rear of the mowing unit 14, and consists in the simplest case of converging swath boards oriented vertically. In an embodiment, not shown, in place of the swath boards, a transport belt, a transport screw conveyor or the like is provided, that deposit the crop in a swath or windrow on the ground centrally or offset to the side of the mowing unit 14.

The flange region 24 is located as close as possible to the center of gravity of the mowing unit 14 and can be provided with threaded bores, snap closures, hook closures or the like. In the embodiment shown the flange region 24 is formed by two equally large, transversely spaced, flange surfaces 25. Each flange 25 has the same hole pattern of eight threaded holes.

In the present embodiment the transmission 26 is located, in each case, on the left side of the mowing unit 14 as seen in the direction of operation, and is used to drive the mowing head and any processing arrangement that may be present. For this purpose, the transmission 26 is provided with an input shaft 28 of a power transfer arrangement including pulleys or sprockets connected by tensioned flexible drive elements, not shown, for example, a belt or a chain. A recess 30 is provided ahead of the input shaft 28 for an articulated shaft 32, where the recess 30 need not be mandatory.

Spaced toward the opposite side of the housing 20 from the transmission 26 is a further or power-receiving transmission 34 (side mowing units 14) or 34' (central front mowing unit 14) that includes an output shaft 36 (side mowing units 14) or 36' (central front mowing unit 14) and an input shaft 38 (side mowing units 14) or 38' (central front mowing unit 14). This further transmission 34 or 34' is located off center with respect to the direction of operation of the mowing unit 14 and, in this embodiment, is also fastened, so as to be removable, to the right-hand flange 25 of flange region 24, which, however, is not mandatory. The further transmission 34' that is mounted on the central front mowing unit 14 is configured as an angle drive transmission, and the further transmission 34 on the side or wing mowing units 14 is a spur gear drive or a belt drive transmission.

The input shaft 38 of the further transmission 34, of each of the side or wing mowing units 14, extends through a transmission housing 40 and provides on both sides a stub shaft that engages an articulated shaft 32. In lieu of the power-receiving or further transmission 34, it may, from a purely technical standpoint, be possible instead to use two angle gearboxes connected to each other so as to pivot relative to each other about an upright axis, in which the input and the output shaft 38 and 36 can assume any desired position relative to each other. In any case, the output shaft 36 is connected, although it may be disconnected, over the articulated shaft 32 with the input shaft 28 of the transmission 26. In this embodiment the output shaft 36 is located in the same plane on each mowing unit as the input shaft 28 of the transmission 26, as seen transverse to the direction of mowing. Although their vertical alignment is desired, the present embodiment nevertheless provides a small vertical offset, where the inclination of the articulated shaft 28 is made possible since it enters the recess 30. In the further transmission 34' of the central or front mowing unit 14, the input shaft 38' extends perpendicular to the output shaft 36'.

In, on or at the carrier frame 16, there is a main drive transmission 42 which is arranged as an angle drive transmission in T-configuration. The main drive transmission 42 is penetrated by a shaft 44, that operates as an input as well as an output shaft. A drive pulley 46 of a belt drive transmission 48, leading to a power source of the carrier vehicle 12, is fixedly mounted on the shaft 44 for rotation with it. A gear 52, configured as a bevel gear, is mounted, fixed against rotation, on the shaft 44 in a gearbox housing 50, which meshes with a gear 54 also configured as a bevel gear arranged at a right angle to it. The gear 54 is mounted on an output shaft 56, which extends at right angles to the shaft 44 and to output shaft 36' of the further transmission 34' on the forward mowing unit 14. The two angle drive transmissions 34' and 42 may be configured equally so that the input shaft 38' of the transmission 34' would become the input shaft and the output shaft 56 of the transmission 42 would become the input shaft if the transmissions 34' and 42 were exchanged.

All input shafts 38 or 38', output shafts 36, 36' or 56, and shafts 44 are provided with a splined profile, that is not shown but is standard, on which a commercially available articulated shaft 32 can be mounted. In the embodiment shown, in the operating position of the mowing unit 14, the shaft 44 that extends transverse to the direction of mowing and the input shafts 38 as well as the output shafts 36 and the input shafts 26 extend in one alignment. On the other hand, the output shaft 56 of the main drive gearbox 42 is offset to the side of the input shaft 38 of the further gearbox 34 that is configured as an angle drive transmission. In general, an offset of the connecting points is possible within the limits existing for each of the articulated shafts 32 used. If necessary, wide angle joints or several articulated shafts can be used that extend at an angle to each other and that are arranged one behind the other, that are connected to each other, fixed against rotation, over a bearing, not shown, in the flange regions.

Deviating from the above description, the drive of each of the mowing units 14 could also be performed over one or more hydraulic or electric motors whereby individual transmissions or all transmissions 26, 34, 34', or 42 could be omitted.

On the basis of the above description, the result is the following drive concept, where the assumption is that three mowing units 14 are used.

The drive is transmitted from the carrier vehicle 12 over the belt drive transmission 48 to the drive gear 46, which brings the shaft 44 into rotation. The shaft 44 is connected on both sides of the transmission housing 50, fixed against rotation, over one articulated shaft 32 each with the input shaft 38 of the further transmission 34, where, with the left mowing unit 14, an exposed end section of the input shaft 38 projecting from the right side of the transmission housing 40 is connected to the associated shaft 32, and, where, with the right mowing unit 14, an exposed end section of the input shaft 38 projecting from the left side of the gearbox housing 40 is connected to the associated shaft 32. Within the further transmission 34 configured as a spur gear or belt drive transmission, the drive is transmitted further to each of the output shafts 36, if necessary with a step up or reduction in speed, which in turn is connected, fixed against rotation, over an associated articulated shaft 32 with the input shaft 28 of the transmission 26. The transmission 26 finally transmits the drive to the particular mowing head and, if available, processing arrangement. Accordingly, the drive of the mowing units 14 at the sides is performed, or its drive, in case only one mowing unit 14 at the side is used, without the main drive transmission 42 becoming loaded since the shaft 44 extends completely through the transmission housing 50, which serves in the nature of a bearing support for the shaft 44. The drive of the central and the forward mowing unit 14 originates from the shaft 44 or the gear 52 fastened to it, which drives the output shaft 56 through the positive locking connection with the gear 54. The output shaft 56 is connected, fixed against rotation, over a further articulated shaft 32 with the input shaft 38' of the further transmission 34' on the forward mowing unit 14. A further articulated shaft 32 connects the output shaft 36' of the further transmission 34' with the input shaft 28 of the transmission 26, so that thereby the drive of the mowing head and, if available, of the processing arrangement is guaranteed.

The layout of the gearbox 26 as a belt drive gearbox with belts permits, on the one hand, a guarantee of the drive train against overloads and, on the other hand, makes it possible to interrupt the drive of every mowing unit 14 independently of any other mowing unit 14.

Beyond that, the arrangement and configuration of the further transmissions 34 makes it possible to replace a damaged mowing unit 14 by another, for example, of the existing combination. An exchange of the mowing units 14 at the sides is possible without any change. An exchange of the forward mowing unit 14 for one on the side is possible, provided the further transmission 34' configured as an angle drive transmission is exchanged for a further gearbox 34 configured as a spur gear drive or belt drive gearbox or vise versa, which is possible without any problem due to the method of arrangement and fastening. This ability to exchange without any problem makes it possible to react rapidly to any damage to a mowing unit 14, so that a mowing unit 14 ready to be applied is always available, and is located ahead of the carrier vehicle 12. The separation of the mowing unit 14 from the carrier 16 is performed in the flange region 24 by means of bolts, screws, hooks or the like, not shown.

Figure 2:
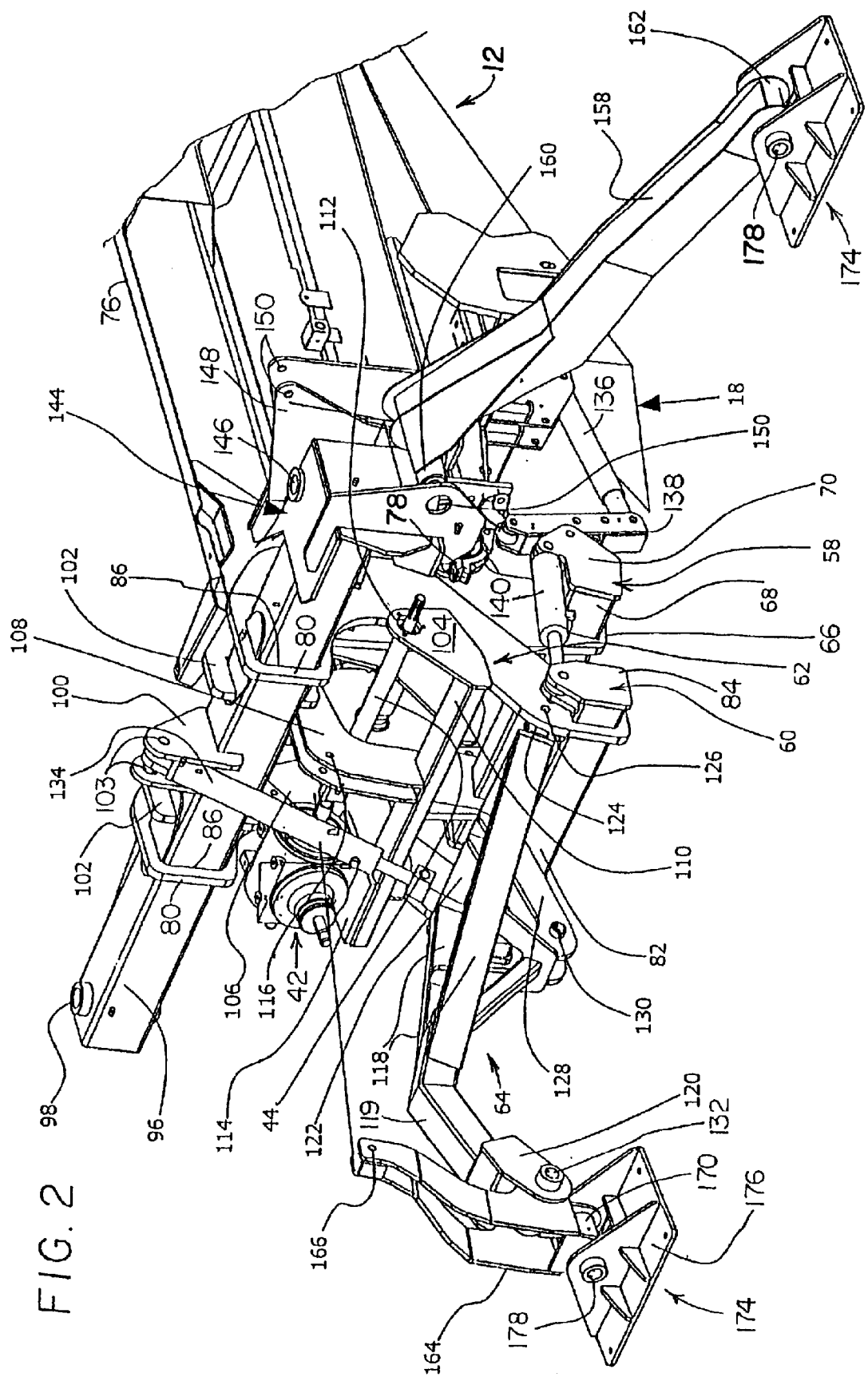
FIG. 2 is a perspective, left front view of a part of the framework for supporting the mowing units.
Figure 3:
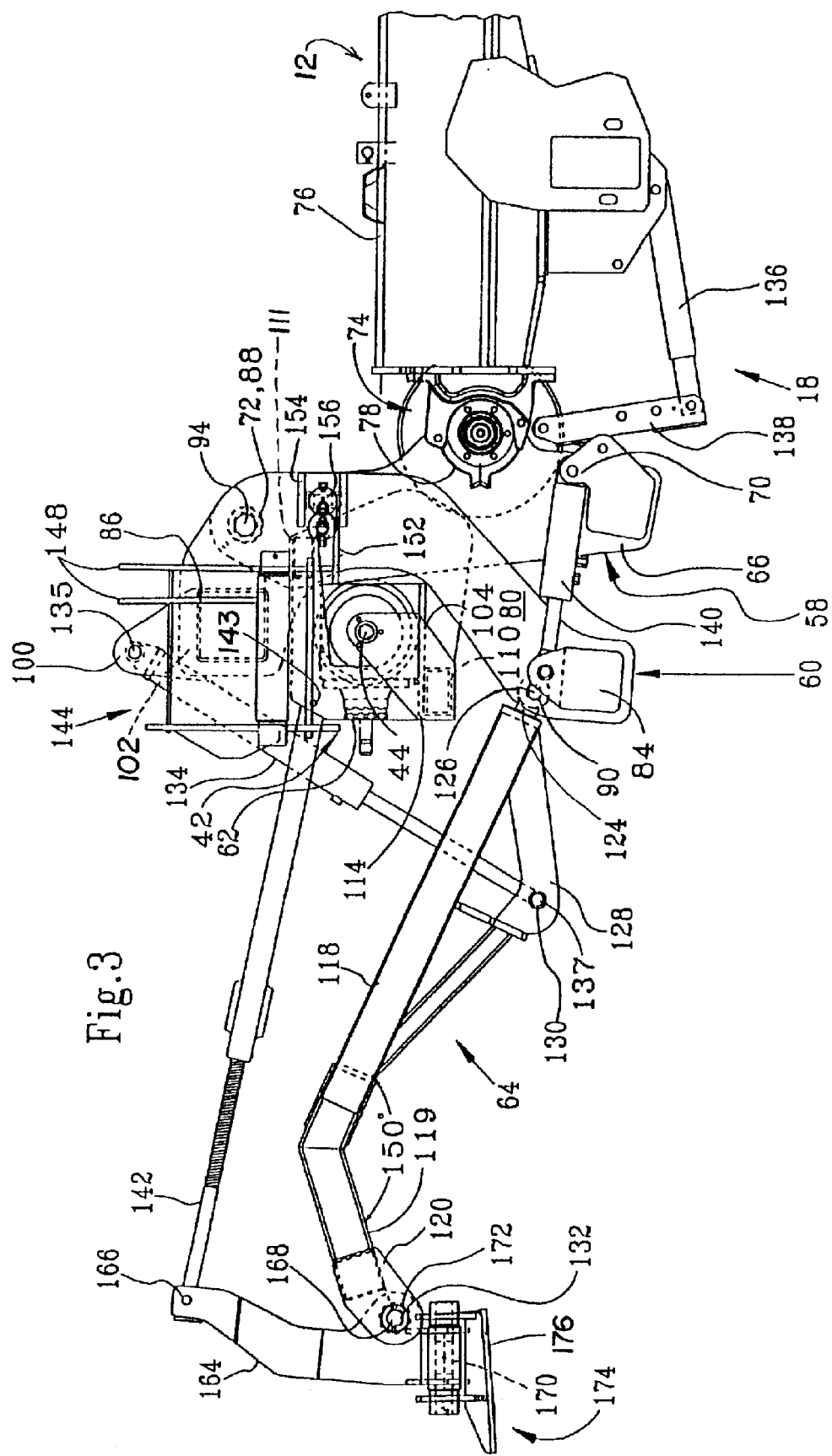
FIG. 3 a left side view of a part of the framework for supporting the mowing units.

Referring now to FIGS. 2 and 3, it can be seen that the carrier 16 is composed of several components, in particular, a first or base carrier part 58, a second carrier part 60, a third carrier part 62 and a fourth carrier part 64, which are carried by the carrier vehicle 12 and can be repositioned in height relative to the ground by its lifting arrangement 18. The carrier 16 forms a unit with the mowing units 14, that can be deposited on the ground or can be transported by the carrier vehicle 12.

The first carrier part 58 contains two plates 66 that are spaced at a distance from each other that are connected to each other by a tube 68 so as to be connected rigidly. The tube 68 extends to the side beyond the plates 66 and is provided with a connection 70. The connection 70 is configured as in the form of a fork and is provided with an opening, not described in any further detail, that accepts a pin. Each plate 66 is provided in its upper end region with a bearing bore 72 and on its rear side in its lower half with a bearing 74 that engages the frame 76 of the carrier vehicle 12 in bearing shells 78 that can be separated so as to pivot vertically. If the bearing shells 78 are separated, the entire carrier 16 can be released from the carrier vehicle 12 and replaced, for example, by a chopper assembly. The bearing 74 is used simultaneously as bearing support for a shaft of the belt drive transmission 48 that is parallel to the shaft 44 on the carrier vehicle 12.

The second carrier part 60, as viewed from the left side, has the shape of the upper part of a question mark. The second carrier part 60 also includes two plates 80 that are transversely spaced from each other and joined together in their lower end regions by a tube 82, of square or rectangular cross section, that projects beyond these to the side and is provided at its ends with a connection 84. The connection 84 is configured as a fork and includes a bore at its upper end for receiving a pin. Each plate 80 is provided in its upper end region with a four-sided opening, in particular a square opening 86. Located in the upper end region of each plate 80 at a location behind the square opening 86 is an upper bearing bore 88, and located in its lower end region beside the connection 84 is a lower bearing bore 90.

In the assembled condition, the first and the second carrier parts 58 and 60, respectively, assume positions in which the plates 80 of the second carrier part 60 are located outside the plates 66 of the first carrier part 58, but are spaced from this by the smallest possible distance. The bearing bores 72 and 88 are used to engage a bearing pin 94, so that the first and the second carrier parts 58 and 60 are connected with each other in a joint, and open and close like a pair of scissors.

Beyond that, as can best be seen in FIG. 2, the second carrier part 60 contains a transverse beam 96 that extends through the openings 86 in, and is connected rigidly, as by welding, with, the plates 80.

The transverse beam 96 is configured as a steel tube with a square cross section that extends close to the side edges of the carrier vehicle frame 76. In each of the outer regions of the beam 96, a bearing eye 98 is provided that defines an at least generally vertical pivot axis. In the center of the transverse beam 96, and on its upper side, a fork 100 is located that contains bores 103. On the rear side of the transverse beam 96, two ribs 102 are attached that are oriented vertically, that extend parallel to the plates 80 and maintain a spacing to these, so that they take up the plates 66 of the first carrier part 58 in the intervening free space and aid in carrying the bearing pin 94. By reason of the connection of the transverse beam 96 with the plates 80, the transverse beam 96 follows every pivoting movement of the second carrier part 60.

The third carrier part 62 has approximately the shape of a box with pairs of left plates 104, right plates 106 and central plates 108 all of which extend parallel to each other and are rigidly connected, in particular welded, to each other by means of a forward lower tube or bar 110 and a rear upper tube or bar 111 (FIG. 3). Each of the inner plates of the left and the right plates 104 and 106 are bolted to the inner side of the plates 80 of the second carrier part 60. Each of the outer plates of the left and the right plates 104 and 106 are located opposite the outer side of the plates 80 and are provided with a bearing 112 that engages the shaft 44. A plate 114 extending horizontally is welded to the inner side of the inner one of the right plates 106 and to the bar 110, that is primarily used for releasable take-up of the main drive transmission 42. The central plates 108 are configured generally as a ring that leaves an interior space through which the shaft 44 can extend, but this is not mandatory as these plates 108 could also be configured as full surface plates and be equipped with a bearing for the shaft 44. The central plates 108 are spaced at a distance to each other and are provided with bores 116 in a forward upper corner region. By reason of the connection of the third carrier part 62 with the second carrier part 60, the third carrier part 62 follows the pivoting movement of the second carrier part 60.

The fourth carrier part 64 takes the form of a gallows and is approximately triangular in shape as viewed in plan view. Thus, the fourth carrier part 64 includes two forwardly converging, equal legs 118 spaced at a large distance from each other at the rear end and joined by a transverse third leg, that adjoins the second carrier part 60. A stem 119 is joined to the legs 118 in their converging forward end region, the stem 119 having a fork 120 defined at its free end. In side view, it can be seen that the stem 119 of the fourth carrier part 64 is angled such that it forms an included angle of approximately 150° with the legs 118. A third leg 122 extends parallel to the bars 110 and 82 and connects the rear ends of the two legs 118 in the installed condition. In each of the end regions of the third leg 122, an ear or bracket 124 is located that contains a bore, not described in any further detail. In the installed condition of the fourth carrier part 64, the bore of the bracket 124 is axially aligned with the bore 90, with a pin 126 being received in the aligned bores. Joined to, as by welding, and projecting downwardly from a central region of the third leg 122, from inside locations along the lengths of the legs 118, and from the bottom of the stem 119, is a support angle 128 that is in the form of a weldment constructed of sheet metal components, not described any further. A bore 130 (FIG. 2) is provided in the corner region of the support angle 128. The fork 120 is provided with a bearing eye or bore 132 that extends transverse to the length of the fourth carrier part 64. During operation the fourth carrier part 64 is connected with the second carrier part 60, in particular by means of the pins 126 which are inserted through the bore 90 and a first positioning arrangement 134, that is configured as a threaded spindle or as a motor, in particular, a hydraulic motor. The positioning arrangement 134 is fastened at one end by means of a pin 135 in the fork 100 on the second carrier part 60 and at its other end by means of a pin 137 in the bores 130 on the fourth carrier part 64. According to the above description, the result is a carrier 16 that is composed of the first through the fourth carrier parts 58, 60, 62 and 64, respectively.

The adjustment or repositioning of the carrier 16 relative to the carrier vehicle 12 is performed by means of the lifting arrangement 18 which is provided with a second positioning arrangement 136, preferably in the form of a hydraulic cylinder and a pivot arm 138, that can pivot at one end about a horizontal axis extending in the transverse direction on the frame 76 and is loaded at its other end by the second positioning arrangement 136, or is connected with it. The first carrier part 58 is not connected directly with the pivot arm 138 or the second positioning arrangement 136, but is merely in contact with these. An extension of the second positioning arrangement 136 brings about a pivoting movement of the entire carrier 16 about the pivot axis of the bearing 74 in the clockwise direction as seen in FIG. 3. An unloading of the second positioning arrangement 136 leads to an opposite pivoting movement of the carrier 16 on the basis of the force of gravity.

A third positioning arrangement 140, also preferably configured as a single acting hydraulic motor, extends between the connection 70 on the first carrier part 58 and the connection 84 on the second carrier part 60 and is secured in each of these by means of pins, in its end regions.

Finally, a fourth positioning arrangement 142 (FIG. 3) is provided that can be secured at its rear end region by means of a pin 143 that penetrates the bores 116 (FIG. 2) of the central rib 108. In its simplest form, the fourth positioning device 142 can be configured as a chain, a strut or some other component of invariable length. However, as shown in FIG. 3, the positioning device 142 is a variable length turnbuckle, but can also be configured as a hydraulic cylinder.

While only the left end assembly is shown in FIG. 2, at each of the ends of the transverse beam 96, a universal joint carrier or bracket 144 is provided that could be composed of two U-shaped components, where each of the U-shaped parts coincide in their bottom region and are indexed by 90 degrees to each other. An inner region facing the transverse beam 96 reaches over the end region of the transverse beam 96 with its U-shape, where the "U" is open in the horizontal direction. The legs are provided with a bearing 146 with a vertical bearing axis in the installed condition that coincides with the axis of the bearing eyes 98, whereby a pin, not shown, can be installed that penetrates the bearing 146 and the bearing eyes 98. The region facing away from the transverse beam 96 represents the second "U", that is open in the vertical direction and is provided with legs 148, that are provided with bores 150 aligned with each other, through which a horizontal axis extends. One end of a hydraulic, mowing unit lift cylinder (not shown) would be attached here while its other end would be attached to a pair of legs (visible only in FIG. 1) provided on a mower unit support arm 158, described below. On the outside of the rear leg 148, a fork 152 is located that is positioned at the same height as a fork 154 on the outside of the plates 80 of the second carrier part 60.

A fifth positioning device 156 has its opposite ends respectively retained in one of the forks 152 and 154, free to pivot, and is configured in particular as a double acting hydraulic motor.

One of the arms 158 is provided for supporting each side-mounted mowing unit 14 and is in the form of a tube or tube end in a weldment that is approximately half as long as the width of the associated mowing unit 14. The arm 158 is provided at one end with an inner bearing eye 160 and at its other end with an outer bearing eye 162 whose pivot axes extend parallel to each other and that contain, for example, a welded tube as a bearing surface.

An arm 164 for the forward central mowing unit 14 is also configured as a tube or a weldment and is provided with an upper bearing eye 166, and central and lower bearing eyes, respectively, (not shown) where the pivot axes extending through the upper bearing eye 166 and the central bearing eye are parallel to each other and, in the installed condition of the arms 164, the central bearing eye is aligned with the bearing eye 132 of the fork 120. The upper bearing eye 166 is located in the uppermost end region of the arm 164 and the central bearing eye is located near the lower end region of the arm 164. The lower bearing eye 170 is located in the lower end region of the arm 164 and is provided with a pivot axis generally extending horizontally that is indexed through 90 degrees relative to the pivot axes of the upper and the central bearing eyes. If the arm 164 is seen from the front in the installed condition, then its upper end region is offset to the side from the rest by almost the width of the arm 164. The upper bearing eye 166 is used for the connection with the fourth positioning arrangement 142, and the central bearing eye is used for the connection to the fork 120 at its bearing eye 132, in each case by means of corresponding pins.

Finally, connecting consoles 174 are provided for each mowing unit 14, the consoles 174 each including a plate 176 and a bearing eye 178. In the preferred embodiment, the connecting consoles 174 for all mowing units 14 are identical and are inserted between each of the arms 158 or 164 and each of the mowing units 14. The plate 176 is rigidly connected with the bearing eye 178, in particular welded and is provided with a hole pattern that conforms to a hole pattern in the flange region 24. The bearing eye 178 is configured in such a way that it can be connected by means of corresponding pins with the bearing eye 162 of the side mowing unit support arms 158, or the bearing eye 170 of the front mowing unit support arm 164, where the pivot axes extend in the direction of mowing of the mowing arrangement 10.

On the basis of the above description, the mowing arrangement 10 is assembled and attached to the carrier 16 in such a way that each mowing unit 14 with its flange region 24 is connected initially with the connecting console 174 this with the corresponding arms 158 and 164. The arms 158 and 164 are, in turn, connected together with the fourth carrier part 64 or the transverse beam 96 of the second carrier part 60, the second carrier part 60 with the first carrier part 58 and the first carrier part 58 with the frame 76.

In order to reach each of the positions of the carrier parts 58 through 64 and the mowing units 14 fastened thereto, positioning or adjusting devices 134, 136, 140, 142, 156 are assembled correspondingly and, as far as necessary, connected to a corresponding positioning system, for example, a hydraulic system, in particular, that of the carrier vehicle 12.

Finally, the main drive transmission 42 is mounted on the third carrier part 62 and the drive connections according to the above description are established by means of the articulated shafts 32 and connected with a drive, not shown, on the carrier vehicle 12 that may be transmitted over a countershaft 180 (FIG. 1) to the belt drive transmission 48.

Having described the preferred embodiment, it will become apparent that various modifications can be made without departing from the scope of the invention as defined in the accompanying claims.

What is claimed is:

1. A mowing arrangement, having a direction of travel during mowing, comprising: a main support frame; a mowing unit carrier including a base carrier part mounted to said main support frame for being moved vertically about a fixed, first horizontal axis extending perpendicular to said direction of travel; a remotely operable lifting device being operatively arranged between said main support frame and said base carrier part for selectively effecting vertical movement of said base carrier part; a second carrier part being mounted to said base carrier part for pivoting vertically about a second horizontal axis extending parallel to said first horizontal axis; a remotely operable adjusting device being coupled between said base carrier part and said second carrier part for effecting selected vertical pivoting of said second carrier part; at least one mowing unit exclusive of said second carrier part; a mounting structure connecting said at least one mowing unit to said second carrier part such that when said remotely operable adjusting device is operated a cutting angle of said at least one mowing unit, from front to rear along said direction of travel, is adjusted.

2. The mowing arrangement, as defined in claim 1, wherein a bearing arrangement is provided for mounting said base carrier part to said main frame for pivoting about said first horizontal axis; and said lifting device including a lever pivotally coupled to said main frame and coupled to an actuator operable for selectively pivoting said lever into engagement with said base carrier part so as to pivot the latter about said first horizontal axis.

3. The mowing arrangement, as defined in claim 1, wherein said second horizontal axis is located above said remotely operable adjusting device.

4. The mowing arrangement, as defined in claim 1, wherein said at least one mowing unit is mounted to one side of said second carrier part and a second mowing unit being mounted to an opposite second side of said second carrier part in a mirror image manner about a longitudinal center axis of said main support frame.

5. The mowing arrangement, as defined in claim 1, wherein said at least one mowing unit is mounted to one side of said second carrier part; and said mowing arrangement further including a second mowing unit mounted at a forward location of said second carrier part.

6. The mowing arrangement, as defined in claim 5, and further including a third carrier part fixed to said second carrier part; and a transmission mounted to said third carrier part and having respective drive shafts oriented for being coupled to said at least one and second mowing units.

7. The mowing arrangement, as defined in claim 6, wherein a fourth carrier part in the form of a parallelogram linkage is coupled to a carrier structure, defined by said second and third carrier parts; said parallelogram linkage including a second adjusting device; a third adjusting device being mounted between said carrier structure and said parallelogram linkage; and said second mowing unit being coupled to said parallelogram linkage so as to be raised and lowered through operation of said third adjusting device and so as to be tilted in response to operation of said second adjusting device.

8. The mowing arrangement, as defined in claim 1, wherein said mounting structure for said at least one mowing unit includes a universal joint arrangement mounted to one side of said second carrier part for pivoting about an upright axis; and said mounting structure further including an elongate arm having one end mounted to said universal joint arrangement for pivoting about a longitudinal axis, which is perpendicular to said upright axis, and a second end mounted to said at least one mowing unit to thereby mount said at least one mowing unit to a side of said second carrier part.

9. The mowing arrangement, as defined in claim 8, wherein said second carrier part includes a horizontal, transverse tube having a rectangular cross section; and said universal arrangement including a pair of plates respectively extending above and below said tube and mounted thereto by a bearing arrangement defining said upright axis.

10. The mowing arrangement, as defined in claim 1, wherein said lifting device has a one-way connection with said base carrier part for effecting lifting of said base carrier part, with gravity working to cause the base carrier part to lower when a lifting force is relieved through operation of said lifting device.

11. The mowing arrangement, as defined in claim 1 wherein said mounting structure for said at least one mowing unit includes an arm having a bearing eye located at one end which defines a longitudinally extending support axis; said mowing unit including a connecting console releasably coupled to said support arm at said bearing eye including a plate releasably fixed to said mowing unit, whereby said console can be separated from said arm as well as from the mowing unit.

12. The mowing arrangement, as defined in claim 11, wherein said mowing arrangement includes a second mowing unit; a second arm being provided for supporting said second mowing unit; and a second console identical to said first-mentioned console being connected between said second arm and said second mowing unit.

* * * * *